United States Patent
Takahashi et al.

(10) Patent No.: US 7,526,183 B2
(45) Date of Patent: Apr. 28, 2009

(54) RECEIVING TERMINAL DEVICE AND CONTROL METHOD THEREFOR

(75) Inventors: Toshiaki Takahashi, Tokyo (JP); Takeshi Sano, Tokyo (JP); Fuyuhiko Sugiura, Tokyo (JP); Masaaki Sasada, Tokyo (JP)

(73) Assignee: Tokyo Broadcasting Systems, Inc., Tokyo (JP)

( * ) Notice: Subject to any disclaimer, the term of this patent is extended or adjusted under 35 U.S.C. 154(b) by 1085 days.

(21) Appl. No.: 10/203,605

(22) PCT Filed: Feb. 9, 2001

(86) PCT No.: PCT/JP01/00949

§ 371 (c)(1),
(2), (4) Date: Nov. 20, 2002

(87) PCT Pub. No.: WO01/60057

PCT Pub. Date: Aug. 16, 2001

(65) Prior Publication Data

US 2003/0099457 A1    May 29, 2003

(30) Foreign Application Priority Data

Feb. 10, 2000    (JP)    ............... 2000-034207

(51) Int. Cl.
*H04N 5/91*    (2006.01)
(52) U.S. Cl. ............................................. 386/68
(58) Field of Classification Search ............. 386/46, 386/68, 45, 1, 52, 95; 360/7; 348/732, 720
See application file for complete search history.

(56) References Cited

U.S. PATENT DOCUMENTS 5,668,917 A * 9/1997 Lewine ................ 386/52

(Continued)

FOREIGN PATENT DOCUMENTS

JP    48-20419    3/1973

(Continued)

OTHER PUBLICATIONS

Patent Abstracts of Japan publication No. 2000-270274, published Sep. 29, 2000.

(Continued)

*Primary Examiner*—Thai Tran
*Assistant Examiner*—Tat Chi Chio
(74) *Attorney, Agent, or Firm*—Osha • Liang LLP

(57) ABSTRACT

A receiving terminal device which provides viewers with broadcasting radio waves from broadcasting stations as programs and in which, when a program switching is executed while a first program is being provided and a program is switched to a second program, the second program is provided and video recording of the first program is started, and when the program is switched back to the first program after the program is switched to the second program, the recorded first program is provided. Then, the receiving terminal device, when the first program is selected again, executes catch-up reproduction of the recorded first program in the manner that the position of recording and reproducing the first program catch up with a position in which the first program is being broadcast by the broadcasting station. Thus, even in case that a switching of a program selection is executed, a broadcasting service without failure of program contents viewing can be realized.

21 Claims, 16 Drawing Sheets

U.S. PATENT DOCUMENTS

| | | | | |
|---|---|---|---|---|
| 5,692,213 | A | * 11/1997 | Goldberg et al. | 715/500.1 |
| 5,999,691 | A | * 12/1999 | Takagi et al. | 386/46 |
| 6,005,601 | A | * 12/1999 | Ohkura et al. | 725/52 |
| 6,542,695 | B1 | * 4/2003 | Akiba et al. | 386/125 |
| 6,804,824 | B1 | * 10/2004 | Potrebic et al. | 725/38 |

FOREIGN PATENT DOCUMENTS

| | | |
|---|---|---|
| JP | 06-245157 | 9/1994 |
| JP | 07-250305 | 9/1995 |
| JP | 7-264529 | 10/1995 |
| JP | 08-279273 | 10/1996 |
| JP | 2000-13678 | 1/2000 |
| JP | 2000-032399 | 1/2000 |
| JP | 2000-270274 | 9/2000 |

OTHER PUBLICATIONS

Patent Abstracts of Japan publication No. 2000-032399, published Jan. 28, 2000.

Patent Abstracts of Japan publication No. 07-250305, published Sep. 26, 1995.

Patent Abstracts of Japan publication No. 08-279273, published Oct. 22, 1996.

Patent Abstracts of Japan publication No. 06-245157, published Sep. 2, 1994.

Patent Abstract of Japan for Japanese Patent Application No. 7-264529, Publication Date: Oct. 13, 1995, 1 page.

Mechanical English translation for Japanese Patent Application No. 7-264529, Publication Date: Oct. 13, 1995, 20 pages.

Patent Abstract of Japan for Japanese Patent Application No. 2000-13678, Publication Date: Jan. 14, 2000; 1 page.

Mechanical English Translation for Japanese Patent Application No. 2000-013678, Publication Date: Jan. 14, 2000; 14 pages.

* cited by examiner

FIG.13
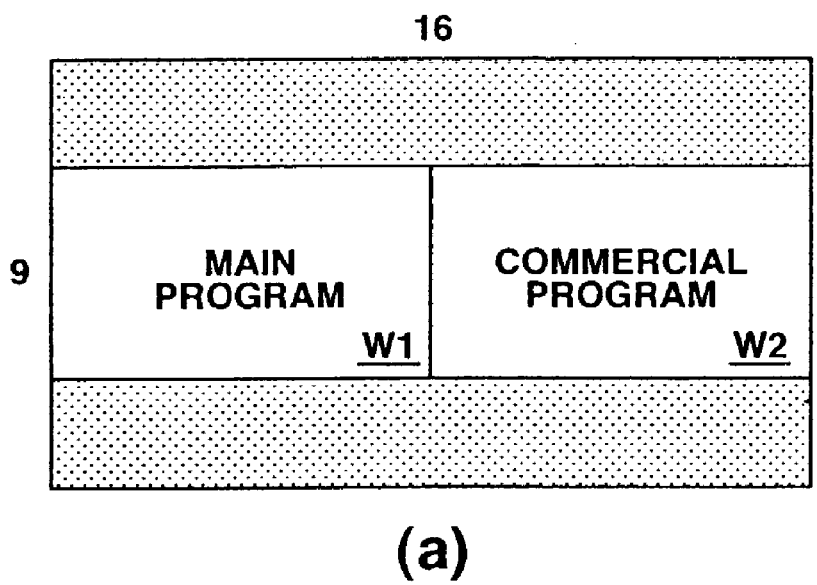
(a)
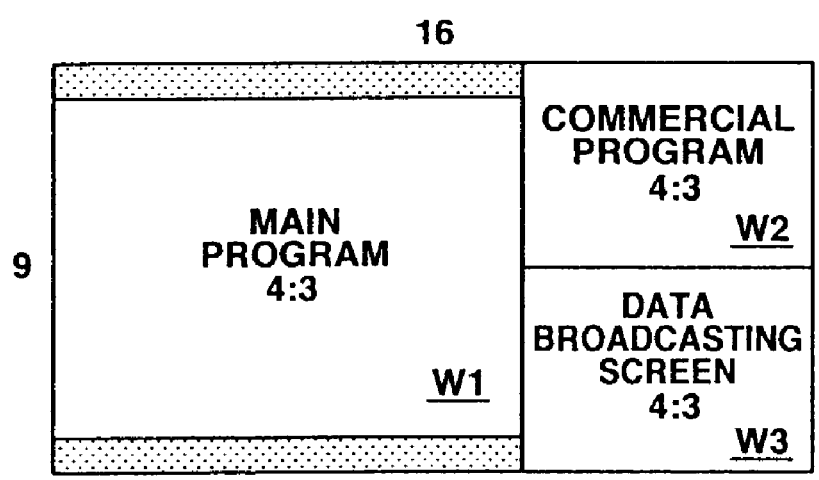
(b)

RECEIVING TERMINAL DEVICE AND CONTROL METHOD THEREFOR

TECHNICAL FIELD

This invention relates to output devices and receiving terminal devices for use in digital broadcasts.

BACKGROUND ART

In general television broadcasting services, viewers receive broadcasting waves sent from broadcasting stations by receiving terminal devices and view programs which are expressed as audio/video information.

That is, when a program is a real time type program, a receiving terminal device decodes and reproduces in real time a selected stream from those transmitted from a broadcasting station thereby providing video/audio information to a viewer. When a viewer switches the channel, the receiving terminal device decodes and reproduce a newly selected stream instead of the stream being decoded and reproduced previously.

In the case where the real time type program is viewed in the manner as described above, a viewer cannot view a part of a program content during the program being viewed is interrupted and switched to another program to view another program even when the channel is switched back to view again the program originally viewed. Therefore, when the viewer wishes to view a certain program consecutively, the viewer deals with this by video recording the program and viewing it afterwards.

However, it is very troublesome to operate for video recording every time of switching the channel and after all; the viewer has no other way but records the program from the beginning. Further, in case that the program was recorded from the beginning, it is difficult for the viewer to determine the time point to play, so that the viewer has to search the point to resume by conducting high speed play reproduction.

Further, implementation of digital broadcasting services multichannel broadcast and various services will be provided. For example, a service in which a broadcasting station controls receiving terminal devices of the viewers to switch a program by using a transmission stream becomes possible. In this case, when it is controlled to switch the real time program to another program and then to switch back to the former program, viewing of the program is obstructed if a failure of the program content to view is cased, thus it is not satisfactory as a broadcasting service.

Consequently, it is an object of the present invention to provide a broadcasting service which does not cause failure of viewing of program contents even if the program selection is switched.

Particularly it is an object of the present invention to provide a broadcasting service in which, when a real time program which is being viewed by a viewer is interrupted to switch to another program and then switched back to the former program, the program is resumed from the program content at which the program is interrupted.

Further, it is an object of the present invention to provide a broadcasting service in which, when a real time program which is being viewed by a viewer is interrupted to switch to another program and then switched back to the former program, viewing is resumed from the program content at which the program is interrupted and the time difference caused therefrom is solved gradually, so that the viewer does not feel uncomfortable.

DISCLOSURE OF THE INVENTION

An aspect of the invention is a receiving terminal device which provides broadcasting waves from broadcasting stations to viewers as programs, in which, when program switching is executed while a first program is being provided to switch to a second program, the second program is provided and a video recording of the first program is started, and when the switched second program is switch back to the first program, the recorded first program is provided. Switching between programs may be made by control information which is transmitted from a broadcasting station or by voluntary switching (selection of stations) by a viewer.

Then, when the first program is selected again, the invention executes catch-up reproduction in the manner such that the position of reproducing the first program catches up with the position in which the first program is being broadcasted by a broadcasting station.

Thus, it becomes possible that the viewer, even while a program is being switched, views afterward contents of the program which is being broadcasted by the broadcasting station. Further, it becomes possible that the viewer views contents of the program with a smaller time than the time during which another program was being switched.

Specifically, the invention is a receiving terminal device which selects a particular stream from the received streams and reproduces the selected stream as video/audio information, characterized in that, when a second stream is selected while a first stream is being filtered through, the device stores a stream in the first stream following the time point at which the second stream is selected and reproduces the selected second stream.

Here, the receiving terminal device is characterized in that, when the second stream is selected and thereafter the first stream is selected again, the stored stream is reproduced.

Further, the receiving terminal device is characterized in that it obtains reproduction start position information from the received stream and reproduces the stored steam from the reproduction start position. Thus, the receiving terminal device becomes possible to reproduce the stored stream from an arbitrary position.

Furthermore, the receiving terminal device is characterized in that it obtains time management information at the selected time point and reproduces the stored stream from the position specified by the obtained time management information.

On reproduction of the stored stream, the receiving terminal device is characterized in that the stored stream is reproduced in the manner such that the reproduction position of the stored steam in a reproduction time axis catches up with the reproduction position of the first stream in a real time axis. Further, it is preferable that the receiving terminal device displays on a screen a time difference information between the reproduction position of the stored steam in the reproduction time axis and the reproduction position of the first stream in the real time axis.

In addition, in order for the receiving terminal device to reproduce the stored stream in the manner such that the reproduction position of the stored stream in the reproduction time axis catches up with the reproduction position of the first stream in the real time axis, the stored stream may be reproduced in fast play reproduction. Further, the receiving terminal device may execute thin-out processing on the stored stream.

As for this thin-out processing, there is a method in which the thin-out processing is applied to a particular frame data to be generated based upon the stored stream. Further, there is a method in which a partial stream corresponding to a predetermined program content in the stored stream is processed to be thinned out. Furthermore, a partial stream in the stored streams corresponding to a program content other than a program content which is selected in accordance with user information inputted in advance may be processed to be thinned out. Moreover, when the stored stream contains n partial streams corresponding to the predetermined program content, n−1 partial streams may be processed to be thinned out.

In addition, the partial stream to which the thin-out processing was applied may be stored and read out according to need to be reproduced.

Further, the receiving terminal device is characterized by storing the first stream until the reproduction position of the stored stream in the reproduction time axis catches up with the reproduction position of the first stream in the real time axis.

Furthermore, the receiving terminal device is characterized in that, when the first stream is selected again after the second stream is selected, the selected first stream is reproduced on a first window and the stored steam is reproduced on a second window.

Here, the receiving terminal device is characterized in that a partial stream corresponding to the first program content in the stored stream is reproduced on the second window. Further, the receiving terminal device is characterized in that a partial stream corresponding to the second program content in the stored stream is reproduced in fast play reproduction on the first window.

The program switching is executed by controlling the receiving terminal device by a control signal which is sent from a broadcasting station. Further, it may be executed by operation of the viewer which is given through an input unit. Furthermore, it may be executed in accordance with schedule information which is set based upon program guide information (EPG).

Moreover, the invention is a receiving terminal device characterized by comprising a receiving unit for receiving a transferred stream, a memory unit for storing the received stream, an accepting unit for receiving program selection information for selecting a program to be provided to a viewer, an selecting unit for selecting a particular stream in the received streams based upon the program selection information, an output unit for outputting video/audio information based upon the stream to be transmitted, and a control unit for controlling in the manner such that the program selection information for selecting the second stream is received while the first stream is being filtered through, a stream in the first stream following the time point at which the second stream is selected is outputted to the memory unit.

Further, the invention is a method for providing a program characterized by comprising a step for switching to a second program while a first program is being provided, a step for video recording of the first program while the switched second program is being provided, a step for switching back to the first program while the switched second program is being provided, and a stage for proving the first program which is being recorded.

The method for providing a program is characterized in that, when the first program is switched back, catch-up reproduction of the recorded first program and is executed in the manner such that the position of recording and reproducing the first program catches up with the position in which the first program is being broadcasted by a broadcasting station.

Specifically, the invention is a control method of a receiving terminal device which selects a particular stream in the received streams and reproduces the selected stream as video/audio information, characterized in that, when a second stream is selected while a first stream is being filtered through, a stream in the first stream following the time point at which the second stream is selected and the selected second stream is reproduced. Then, the control method of the receiving terminal device is characterized in that, when the first stream is selected again after the second stream is selected, the stored stream is reproduced.

The invention can be practiced as a program which realizes a predetermined function in collaboration with a hardware such as a computer, etc., or a recording medium recording the program.

In the present specification, means does not simply mean physical means but also includes a case in which a function that the means has is realized by software. Further, a function that one means has may be realized by two or more physical means, and functions of two or more means may be realized by one physical means.

BRIEF DESCRIPTION OF THE DRAWINGS

FIG. 13 is a view showing an example of a structure of a screen which is displayed on a display.

BEST MODE FOR CARRYING OUT THE INVENTION

Then, embodiments of the present invention will be explained with reference to the drawings.

In the invention, it is premised on mainly digital broadcasting services. In digital broadcasting services, video and/or audio information and data information can be multiplexed to be delivered to viewer. As a technology for realizing such digital broadcasting services, MPEG2 standard is known. In the following embodiments, it will be explained with MPEG2 standard as an example.

First Embodiment

The present embodiment is characterized in that, in case that a receiving terminal device is controlled in accordance with an instruction from a broadcasting station and after a real time program which is viewed by a viewer is interrupted once and switched to another program, it is returned to the former program, viewing is resumed from the program content at the time point of the interruption.

In addition, in the following explanation, it is assumed that the real time program is a program relating to normal television broadcasting and a program to be changed is a program relating to data broadcasting in the same transport stream. Further, it is assumed that contents data of a program relating to data broadcasting is transferred by Carousel system.

Figure 1:
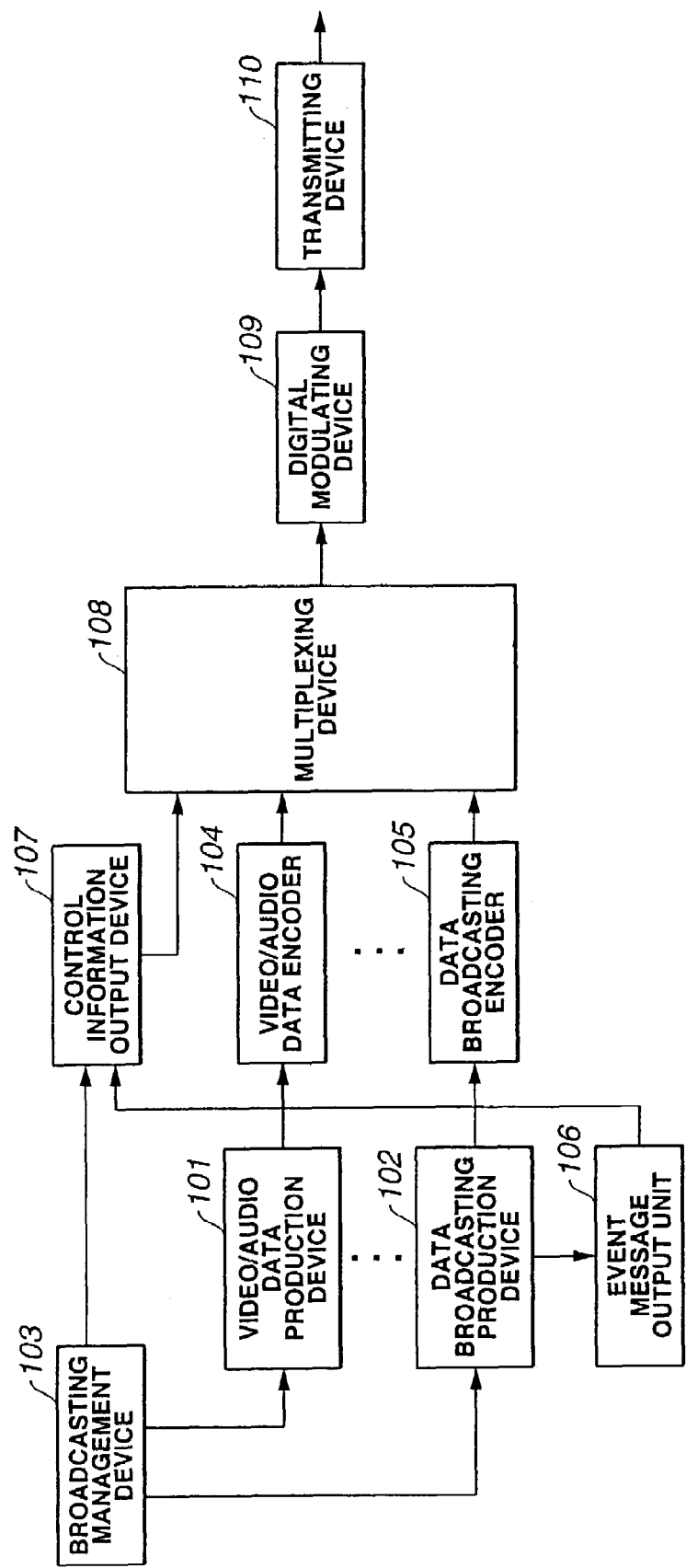
FIG. 1 is a block diagram showing a structure of a broadcasting station side transmission system according to a first embodiment.

FIG. 1 is a block diagram showing a structure of a broadcasting station side transmission system according to the embodiment. A video/audio generating device 101 outputs video data (image data) and audio data (sound data) which are sent out from a video camera and a video server which are not shown in the figure to a video/audio data encoder (hereinafter, referred to as "video/audio data encoder") 103. In the specification, it is assumed that the video data and the audio data are handled as one data as long as it does not stick to it particularly, and this is called as video/audio data. A data broadcasting generating device 102 outputs contents data for use in data broadcasting (hereinafter referred to as "data broadcasting data") to a data broadcasting data encoder 104. The data broadcasting data comprises text data, image data (still picture/motion picture data), audio data, script (control program) and display object data and so on. In addition, the motion picture data has the same meaning as the video data but is used as such a meaning for distinguishing it from video data in television broadcasting. The data broadcasting data is produced by use of a not shown authoring terminal system based upon the video/audio data and other digital data and stored in a file server and so on.

A broadcasting management device 103 gives an instruction for sending the video/audio data and the data broadcasting data to the video/audio generating device 101 and the data broadcasting generating device 102, in accordance with information relating to programming. The broadcasting management device 103 also sends out various information necessary for an operation for providing programs to a control information output device 107.

The video/audio data encoder 104 compresses and encodes the video/audio data which is sent out from the video/audio generating device 101 by control of the broadcasting management device 104 in accordance with MPEG2 video and MPEG2 audio to generate a video/audio stream. The video/audio data encoder 104 sends out the generated video/audio stream to a multiplexing device 108 in PES format. The data broadcasting data encoder 105 compresses and encodes the data broadcasting data which is sent out from the data broadcasting generating device 102 by the control of the broadcasting management device 103 to generate a data broadcasting stream. The data broadcasting data encoder 105 sends out the generated data broadcasting data to the multiplexing device 108 in a section format.

An event message output unit 106 sends out an event message relating to the data broadcasting data which is sent out from the data broadcasting generating device 102 to a control information output device 17. The event message is, as described later, data which is interpreted by a receiving terminal device of a viewer, and the receiving terminal device executes processing according to this event message. That is, taking a look from a broadcasting station side, the broadcasting station can control the receiving terminal device of viewer by using the event message. The control information output device 107 generates various information which is sent out from the broadcasting management device 103 and control information based upon the event message which is sent out from the event message output unit 106. The control information is defined as PSI/SI (Program Specific Information/Service Information). The control information output device 107 sends out the control information to a multiplexing device 108 in the section format.

The multiplexing device 108 multiplexes the video/audio stream in the PES format and the data broadcasting stream and the control information in the section format to generate a MPEG2-transport stream (hereinafter referred to as "multiplexed stream"). The multiplexing device 108, on the occasion of generating the multiplexing stream, superposes furthermore time management information and so on according to need and executes a scramble concerning information to be kept as a secret. The multiplexing device 108 sends out the generated multiplexed stream to a digital modulating device 109.

The digital modulating device 109 digitally modulates the multiplexed stream by a predetermined modulation system and sends out this to a transmitting device 110. As the predetermined modulation system, for example, 8PSK system, OFDM system and so on are exemplified. The transmitting device 110 transmits the digitally modulated stream as a broadcasting wave signal toward a relay station, for example, a broadcasting satellite.

Figure 2:
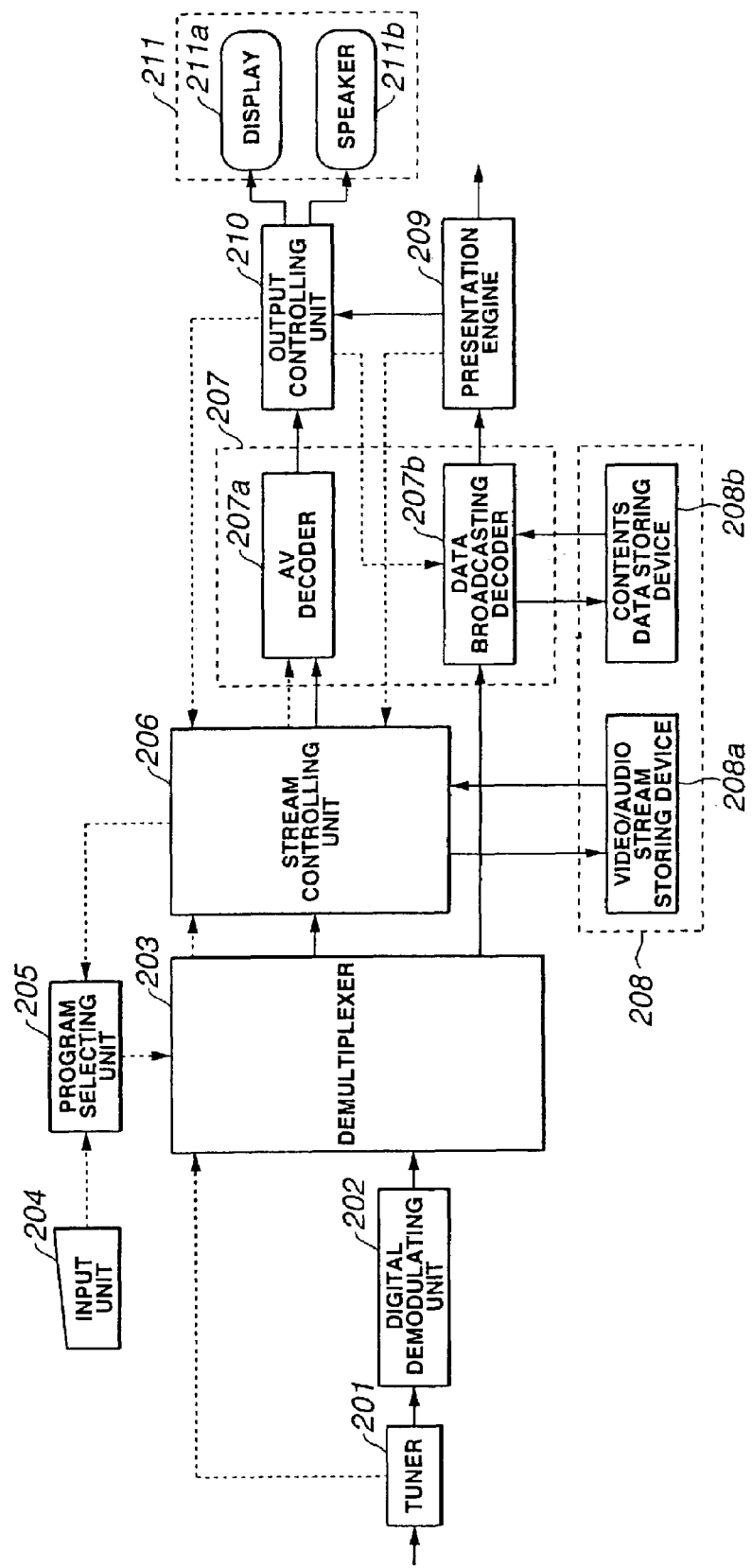
FIG. 2 is a block diagram showing a structure of a receiving terminal device according to the first embodiment.

FIG. 2 is a block diagram showing a structure of the receiving terminal device according to the embodiment. The receiving terminal device, typically, has a receiving function, a storing function, a communicating function and a presenting function. In the following, it will be explained about the receiving function and the storing function and the presenting function closely relating to the embodiment, out of these functions. In addition, such functions of the receiving terminal device can be realized by a hardware in mutual cooperation of a hardware and a software (program).

A tuner 201 selects a broadcasting wave signal corresponding to a particular transponder in the broadcasting wave signals which are supplied from a not-shown antenna and sends out it to a digital demodulating circuit 202.

The digital demodulating circuit 202 demodulates the broadcasting wave signal which was selected and sent out by the tuner 201, and after a predetermined error correction processing is executed, sends out it to a demultiplexer 203. The signal which is sent out from this digital demodulating circuit 202 corresponds to the above described multiplexed stream.

The demultiplexer 203 separates the multiplexed stream to be sent out and selects a particular video/audio stream as the need arises and sends out it to a stream controlling unit 204. The demultiplexer 203, as to the separated data broadcasting stream, sends out it to a data broadcasting decoder 205b. The demultiplexer 203 obtains PID (Packet Identifier) corresponding to a program to be selected and separates a stream in accordance with this PID. The demultiplexer 203 selects a video/audio stream, based upon a program selection operation of a viewer and program switching control by the event message. The demultiplexer 203, when it executes program switching processing, informs the stream controlling unit 206 of it.

An input unit 204 is an input device which is operated by a viewer and typically, corresponds to a remote controller and an operation panel which is formed in a main program of the receiving terminal device. When a viewer wishes to select a desired program and to execute an interactive operation to the program viewing the viewer, can give an instruction to the receiving terminal device through the input unit 204. The program selecting information which is supplied from the input unit 204 is sent out to a program selecting unit 205.

The program selecting unit 205 receives the program selecting information which is sent out from the input unit 204 and sends out an instruction to the demultiplexer 203 so that a program is selected in accordance with the program selecting information. The demultiplexer 203, when it receives the instruction from the program selecting unit 205, selects a video/audio stream corresponding to a program to be selected.

A stream controlling unit 206 controls an input/output path of the video/audio stream to be sent out to the decoder side. That is, the stream controlling unit 206 controls whether the video/audio stream which is sent out from the demultiplexer 203 is sent out to a decoder 207 or to a storing device 208, and further, controls so as to send out the video/audio stream which was stored in the storing device 208 to the decoder 207 instead of the video/audio stream which is sent out from the demultiplexer 203.

The decoder 207 has a video/audio data decoder (hereinafter referred to as "VA decoder") 207a and a data broadcasting decoder 205b. The same figure shows only one VA decoder 207a but a plurality of decoders may be disposed. The VA decoder 207a decodes the video/audio stream to be sent in accordance with MPEG2 video and MPEG2 audio. The VA decoder 207a sends out the decoded video/audio stream to an output controlling unit 210. On the other hand, the data broadcasting decoder 207b decodes the data broadcasting stream and sends out contents data which is obtained by this decoding once to the storing device 208, and reads out the contents data from the storing device 208 in accordance with a predetermined presenting timing, and sends out it to a presentation engine 209. The data broadcasting decoder 207b also interprets an event message which is obtained by the decoding and executes processing based upon the event message. That is, the data broadcasting decoder 207b executes processing such as switching a program to be provided to a viewer, in accordance with the event message which is sent from a broadcasting station.

The storing device 208 has a video/audio stream memory 208a for storing video/audio streams and a contents data memory 208b for storing contents data. The storing device 208, typically comprises a hard disk device, a RAM and so on, and it is preferable that it is of a built-in type one which is impossible to be removed by a user. In addition, in the same figure, one storing device 208 is configured by including the video/audio stream memory 208a and the contents data storing device 208b but may be configured by devices which are respectively independent physically. For example, the video/audio data storing device 208a may be configured by a hard disk device and the contents data storing device 208b may be configured by a flash memory device. Further, a cache function may be provided as the need arises.

A presentation engine 210 generates a screen data for use as a data broadcasting screen (hereinafter referred to as "data broadcasting screen data") according to a predetermined display format, based upon contents data which is sent out from the data broadcasting decoder 207b. A script which is contained in the contents data is also interpreted and executed by the presentation engine 209 to be formed as the data broadcasting screen data. The presentation engine 209 sends out the generated screen data to the output controlling unit 210.

The output controlling unit 210 synthesizes the video/audio data to be sent and the data broadcasting screen data, and converts it into an output signal (an image signal and a sound signal) which is suited to an output device and outputs it. In this figure, as the output device 211, it is configured by a display (monitor) 211a and a speaker 211b.

Figure 3:
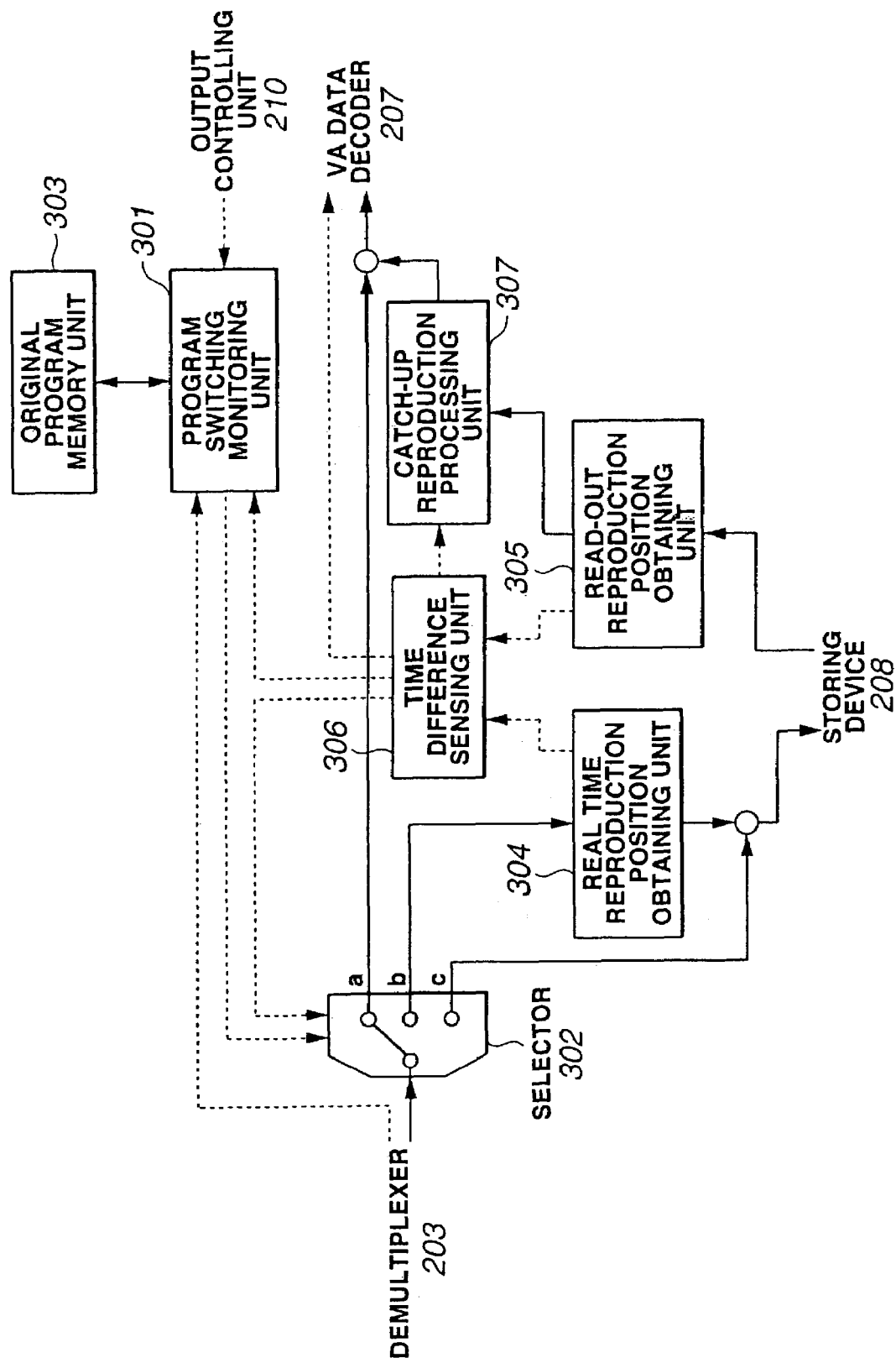
FIG. 3 is a block diagram showing a structure of a stream controlling unit according to the first embodiment.

FIG. 3 is a block diagram showing a functional structure of the stream controlling unit 206 according to the embodiment. As described above, a basic function of the stream controlling unit 206 is to select a input source and a destination of the video/audio stream to be sent to the decoder side. In the embodiment, furthermore, when reading out the stored video/audio stream and sending out it, the stream controlling unit 206 has another function to catch up concerning the video/audio stream and execute reproduction processing.

A program switching monitoring unit 301 monitors whether a program which is provided to viewers is switched or not, and in case that it is judged that a program was switched, controls a selector 302 according to a state of program switching. The selector 302 selectively switches destinations, based upon control of the program switching monitoring unit 301. The state of program switching is defined here as follows.

(1) Initial State: a state after which a particular program A is selected but the program A was not selected in the past as after power was turned on.
(2) First State: a state after which is switched to a program B in the initial state.
(3) Second State: a state after which is switched again to the program A in the first state. That is, it is-a state after which the program A is switched to the program B and then returned again to the program A. This may also include a case in which program B is switched first to a program C and then returned to the program A.

The program switching monitoring unit 301, in order to recognize which state is a state of program switching, when it receives a notice informing that a program was switched (selected), refers to an original program memory 303 which stored program number of the program which was being viewed until just before. That is, the program switching monitoring unit 301, if a value which is stored in the original program memory 301 is null, determines that a state of program switching was transferred from the initial state to the first state, and further, when program number of the program A is already stored in the original program memory unit 301 and it receives a notice informing that the program A was selected, determines that it was transferred from the first state to the second state.

Thus, the program switching monitoring unit 301, in case of the initial stage, gives an instruction to send out the video/audio stream which is inputted from the demultiplexer 203 directly to the VA data decoder 207, and in case of the first state, gives an instruction to send out the video/audio stream directly to the storing device 208, and in case of the second state, gives an instruction to send out the video/audio stream through a real time reproduction position obtaining unit 304 to the storing device 208.

The original program memory unit 303 stores program number of a program which was viewed until just before as stated above. Further, when the program A is switched to the program B, and then to the program C and thereafter returned to the program A, a program switching history may be stored. In this case, the program switching monitoring unit 301 may judge whether the program A exists in the history or not.

The real time reproduction position obtaining unit 304 obtains a position to be received and reproduced in a real time axis of the video/audio stream which is received in real time and sent out through the demultiplexer 203. Meanwhile, the read-out reproduction position obtaining unit 305 obtains a position to be reproduced in a reproduction time axis of the video/audio stream to be read out from the storing device 208.

More specifically, the real time reproduction position obtaining unit 304 obtains sequence number of a packet which configures the video/audio stream which is being received, and regards it as a reproduction position on a real time axis. Further, the read-out reproduction position obtaining unit 305 obtains sequence number of a packet which configures the video/audio stream which is being read out from the storing device 208, and regards it as a reproduction position on a reproduction time axis. Here, in the context that receiving and reproducing are executed in synchronous with an actual transmission in a broadcasting station side, this is called as a reproduction in the real time axis, and in the context that reproducing is executed without synchronizing with the actual transmission of the broadcasting station side after the stream is one stored, this is called as reproduction in the reproduction time axis.

Figure 4:
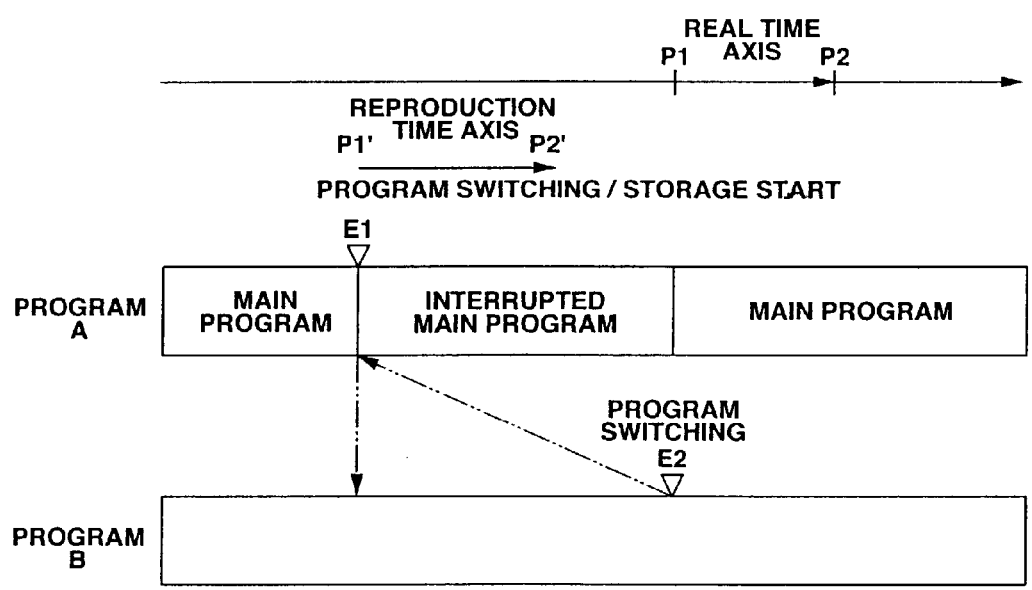
FIG. 4 is a schematic diagram for explaining relation of a real time axis and a reproduction time axis.

FIG. 4 is a schematic diagram for explaining relation of the real time axis and the reproduction time axis. This same figure shows that in the real time axis, a stream of the program A and a stream of the program B are transferred from the broadcasting station side. Here, assuming that while the program A is being viewed, it was switched to the program B at a program switching time point E1, and thereafter, at a program switching time point E2, the program B is switched again to the program A, the program content after the program switching time point E1 is made to be viewed. Now, supposing that the program switching time point E2 is P1 in the real time axis and time passes over from P1 to P2, the receiving terminal device is made to be reproducing a stream which is originally at a position of P2. However, a reproduction position of the stream which is viewed in fact is P2' in the reproduction time axis. Difference of P2 in this real time axis and P2' in the reproduction time axis is called as a time difference. Further, viewing in a state that this time difference occurs is called as a time difference viewing. Then, as described later, the receiving terminal device in the embodiment reproduces the stored stream so as to solve the time difference of this P2 and P2'. That is, time difference D right after being returned to the program A is:

$$D=P2-P2'>0$$

but, by continuing the viewing of the program A, the stored stream is caught up and reproduced so that at a certain time point, it becomes:

$$D=P2-P2'=0.$$

Returning to FIG. 3, a time difference detecting unit 306 obtains a time difference between a reproduction position of a video/audio stream in the real time axis and a reproduction position of a video/audio stream in the reproduction time axis, and informs a catch-up reproduction processing unit 307 of the time difference. The time difference detecting unit 306, at a time point that it judged that the time difference was solved, controls the selector 302 so as to directly send out the video/audio stream which is sent out from the demultiplexer 203 to the VA data decoder 207a.

The catch-up reproduction processing unit 307 executes a catch-up reproduction processing to the video/audio stream to be read out, in such a manner that a reproduction position of the video/audio stream which is read out from the storing device 208 catches up with a position in case that the video/audio stream which is sent out from a broadcasting station in the real time axis is reproduced. As for the catch-up reproduction processing, for example, a thin-out processing concerning the video/audio stream is exemplified. Even in case that the thin-out processing is executed, it is preferable that the processing is made so as not to give uncomfortable feeling to viewers. Therefore, in the catch-up reproduction processing unit 307 in the embodiment, the catch-up reproduction is executed in the manner that only video/audio stream corresponding to a main program content in the video/audio streams passes through and a program content (local event) other than the main program content, for example, a partial stream corresponding to a commercial program is revoked. Determination to a local event is executed with reference to a local event information table LIT (Local event Information Table). Further, the catch-up reproduction processing unit 307 may detect commercial confirmation information and a predetermined description (descriptor) to revoke a partial stream (packets) corresponding to a commercial program.

As for the catch-up reproduction processing, in addition to processing for thinning out a particular program content itself, so-called trick plays including a fast play reproduction, a frame drop reproduction and so on are exemplified. These are realized by thinning out sequentially I, P and B picture frames in the MPEG2 standard from the B picture frame.

It is preferable that such catch-up reproduction processing is executed during decoding the packet by the VA data decoder 207a. In this case, the catch-up reproduction processing unit 307 is configured as a part of the VA data decoder 207a. If the VA data decoder 207a executes such catch-up reproduction processing, it is configured so as to perform trick play control, while the VA data decoder 207a is receiving the time difference information from the time difference detecting unit 306.

Further, as for the sound stream, it may be thinned out in a block unit, in order to synchronize video with audio. In this case, in the same way as normal reproduction of MPEG-TS, PCR (Program Clock Reference) may be used, in order to synchronize video with audio.

Figure 5:
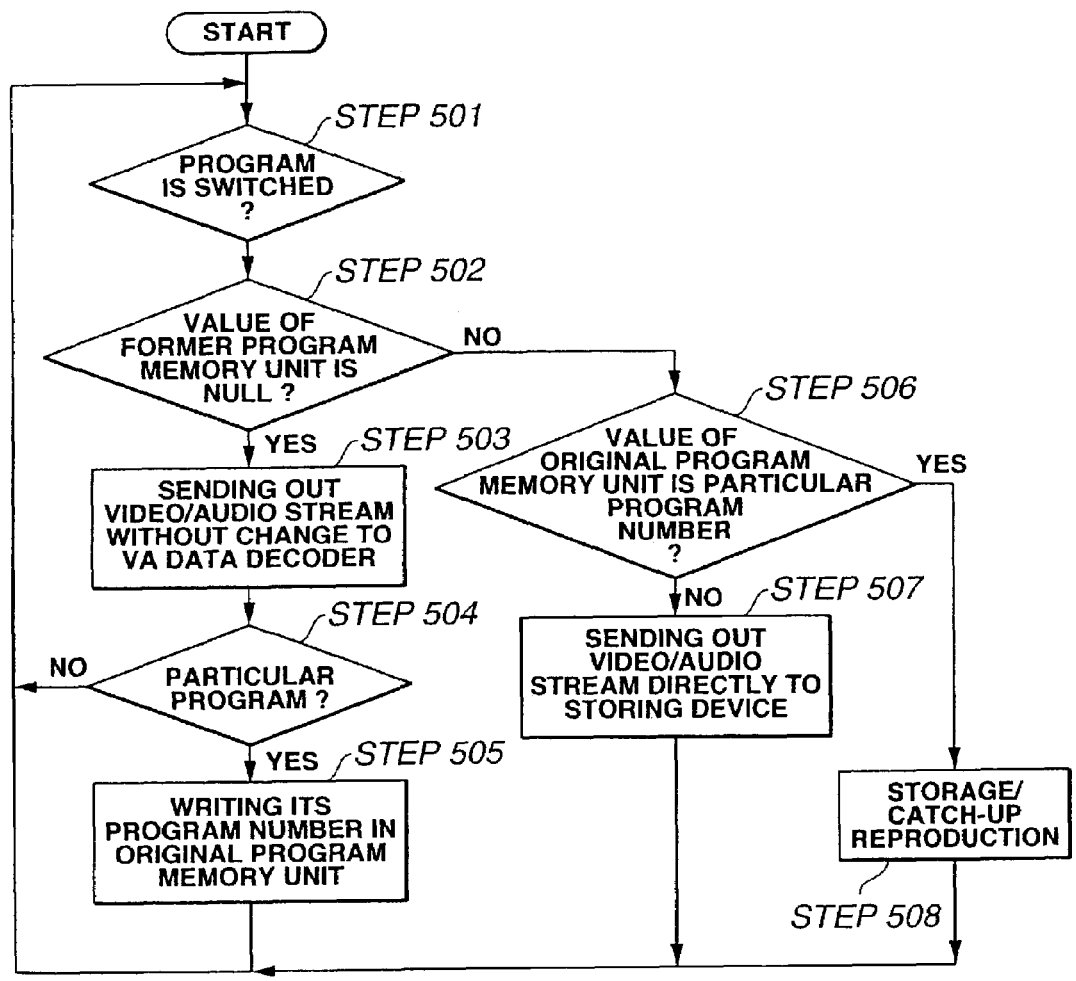
FIG. 5 is a flow chart for explaining an operation of the stream controlling unit according to the first embodiment.

FIG. 5 is a flow chart for explaining an operation of the stream controlling unit 206 according to the embodiment. In this figure, the program switching monitoring unit 301 monitors whether a program is switched or not, that is, whether there is a notice informing that a program was changed from the demultiplexer 203 or the output controlling unit 210 (STEP 501) The program switching monitoring unit 301 refers to the original program memory 303 and judges whether a value of the original program memory 303 is null or not (STEP 502). That is, the program switching monitoring unit 301 judges whether a program switching state is in the initial state or not. When the program switching monitoring unit 301 judges that the value is null, it controls the selector 302 to send out a video/audio stream which is directly sent out from the demultiplexer 203 to the VA data decoder 207a (STEP 503). Thus, the selector 302 is made to select a terminal a in FIG. 3. The program switching monitoring unit 301 judges whether a program which was switched is a particular program or not (STEP 504), and in case that it is judged to be the particular program, writes its program number in the original program memory 303 (STEP 505). The reason that whether it is the particular program or not is judged is that the catch-up reproduction processing is executed as to the particular program. Accordingly, if the catch-up reproduction processing is executed as to all programs, the judgment processing of STEP 5604 may be omitted.

On the other hand, at STEP 502, if the program switching monitoring unit 301 judges that the value of the original program memory unit is not null, it also judges whether the value is the program number of the particular program (STEP 506) If the program switching monitoring unit 301 judges that the value is the particular program number, it controls the selector 302 to send out a video/audio stream which is sent out from the demultiplexer 203, directly to the storing device 208. Thus, the selector 302 is made to select a terminal c set forth in FIG. 3. On the other hand, at STEP 506, if the program switching monitoring unit 301 judges that the value is the particular program number, it controls to execute a storage/catch-up reproduction processing. That is, the program switching monitoring unit 301 controls the selector 302 to send out a video/audio stream which is directly sent out from the demultiplexer 203 to the VA data decoder 207a. Thus, the selector 302 is made to select a terminal b set forth in FIG. 3. At the same time, the program switching monitoring unit controls to send out a video/audio stream which was read out from the storing device 208, instead of the video/audio stream which is sent out from the demultiplexer 203, to the VA data decoder 207a (STEP 508).

Figure 6:
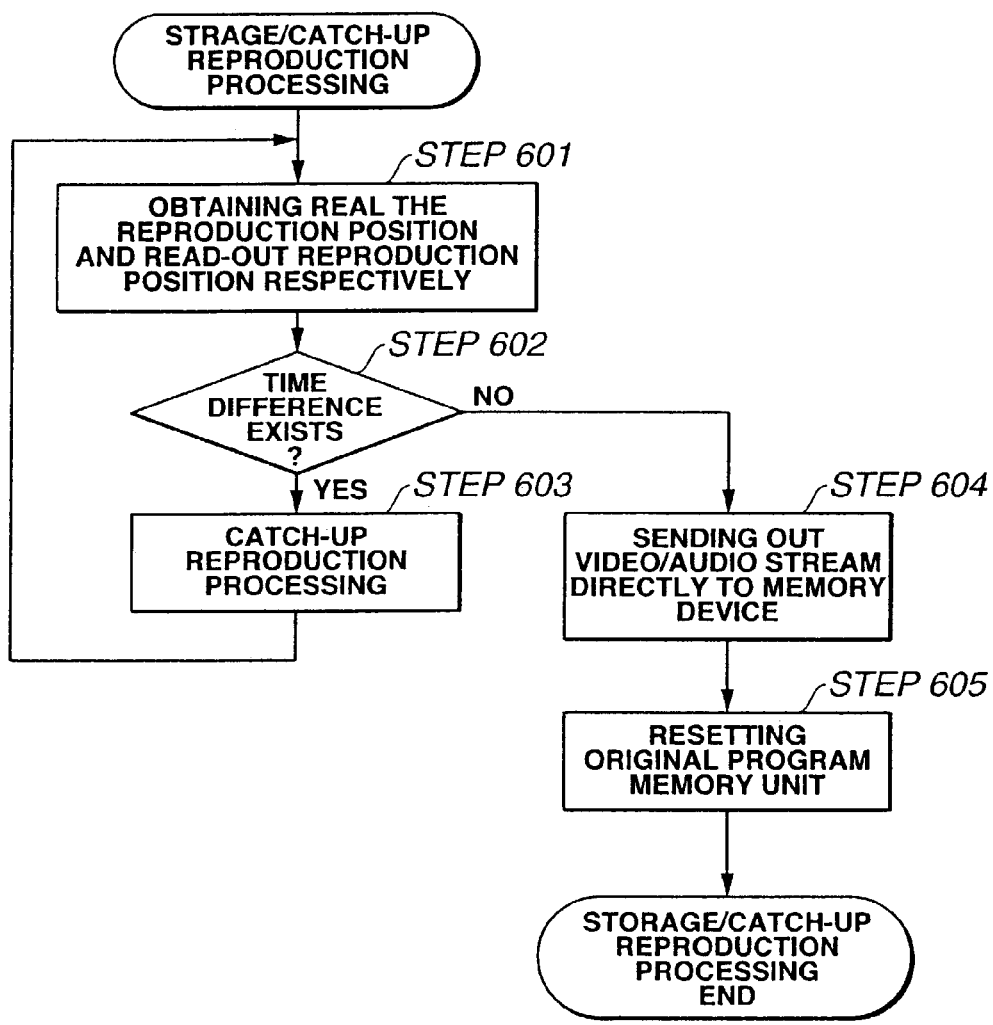
FIG. 6 is a flow chart for explaining an operation of the stream controlling unit according to the first embodiment.

FIG. 6 is a flow chart for explaining the detail of the processing at STEP 508. As shown in this figure, the real time reproduction position obtaining unit 304 obtains a position to be reproduced in the real time axis by TOT (Time Offset Table) or TDT (Time Data Table) from PSI of TS which passes through itself and informs the time difference detecting unit 306 of it. On the other hand, the read-out reproduction position obtaining unit 305 obtains a reproduction position in the reproduction time axis of a video/audio stream which passes through itself and informs the time difference detecting unit 306 of it (STEP 601).

A calculation of a time signal which is used in the time difference detecting unit 306 differs depending upon a storing data format. In the time of storing, PSI is separated from TS and only MPEG-TS is stored, it is preferable to use PCR as a substitute for TOS. Further, in case of a format for storing MPEG-PS, it is preferable to use ESCR as a time signal. Further, it is possible to use a time signal based upon NPT (Normal Play Time).

The time difference detecting unit 306 compares the informed reproduction position in the real time axis to the reproduction position in the reproduction time axis and judges whether there is a time difference between them (STEP 602). If the time difference detecting unit 306 judges that there was the time difference, it gives an instruction for executing the catch-up reproduction processing to the catch-up reproduction processing unit 307, accordingly, the catch-up reproduction processing unit 307 executes (STEP 603). The catch-up reproduction processing unit, as long as it is judged that there is a time difference, executes the catch-up reproduction. On the other hand, a time difference sensing unit 703, in case that it is judged that the time difference is solved, that is, the reproduction position in the reproduction time axis caught up with the reproduction position in the real time axis by the catch-up reproduction processing, controls the selector 302 to send out a video/audio stream to the VA data decoder 207a (STEP 604). Then, the program switching monitoring unit 301 resets contents of the original program memory 303 (STEP 605). In addition, in case that while the stream control unit 206 is executing the storage/catch-up reproduction processing, furthermore, that a program is switched is detected, for example, by an interruption processing, the stream control unit 206 stops storage/reproduction processing.

Figure 7:
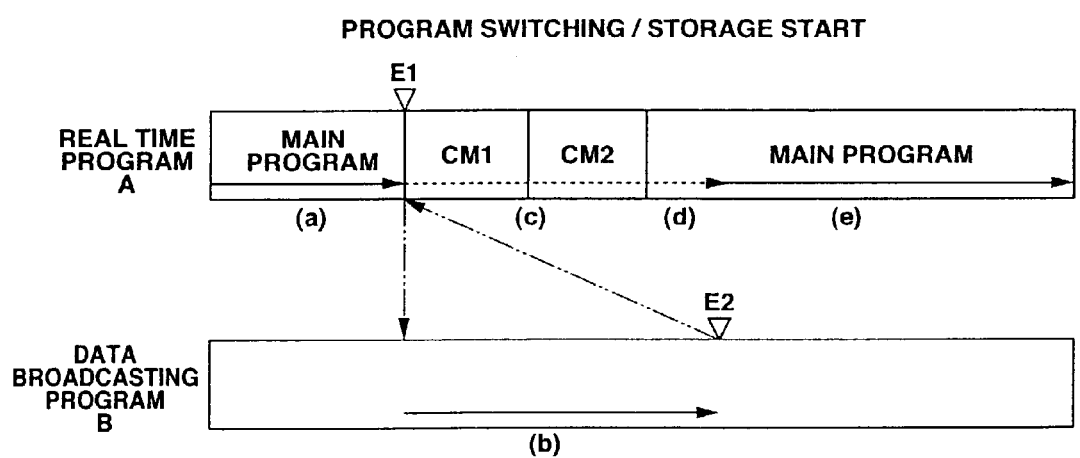
FIG. 7 is a view for explaining one example of program switching when a program is viewed as a stream.
Figure 8:
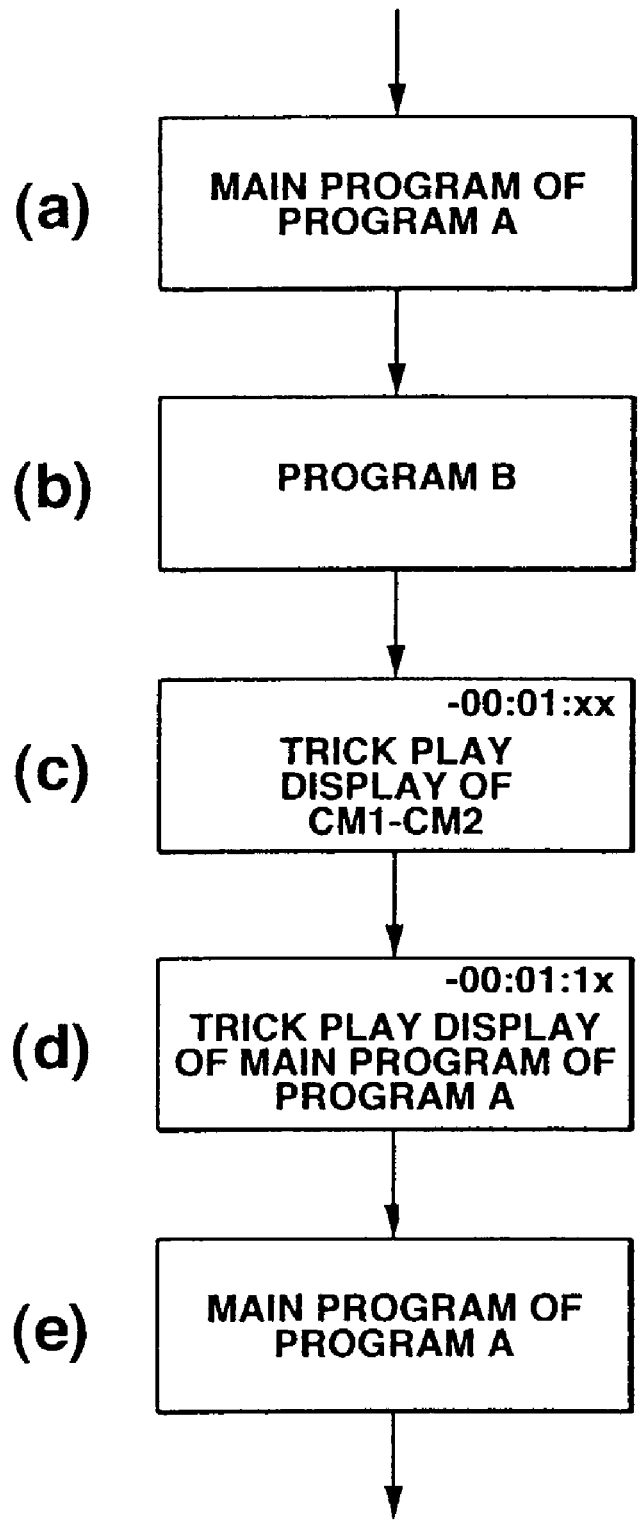
FIG. 8 is a view showing transition of a screen which is displayed on a display.

Then, an operation example of the receiving terminal device which is configured as described above will be explained with reference to FIG. 7 and FIG. 8. FIG. 7 is a view for explaining a condition of program switching when a program is viewed as a stream. In this figure, contents to be viewed by viewers are shown by a solid line arrow and contents to be viewed during the catch-up reproduction processing are shown by a wavy line arrow. FIG. 8 is a view showing transition of a screen which is displayed on a display.

Firstly, it is assumed that a viewer selects a real time program A of a broadcasting station which is conducting program providing services to which the storage/catch-up reproduction is possible. (A screen at this time is shown in FIG. 8A(a). Hereinafter, same as above). It is assumed that a data broadcasting program B is one which realizes an interlock type data broadcasting service of the program A and transferred in advance by the Carousel system and stored in the storing device 208.

Now, it is assumed that while the main program content is being viewed, program switching E1 occurred and a screen was switched to the data broadcasting program B (the same figure (b)). The program switching E1 occurs by, for example, fire by an event message which is transferred by a data broadcasting channel and a program switching operation by a viewer. The receiving terminal device starts a video recording of the program A which was switched, that is, storage of its video/audio stream. Assuming that after lapse of predetermined time, program switching E2 occurred and the program A was selected again, the receiving terminal device starts reproduction of the program A which was stored. In this time, the receiving terminal device, in order to solve the time difference which was occurred by the interruption, executes the catch-up reproduction processing concerning CM1 and CM2 (the same figure (c)). The receiving terminal device displays the time difference on the screen, while the catch-up reproduction processing is executed, in order to present viewers how much time difference is occurring. The catch-up reproduction processing is executed by for example, thin-out CM1 and CM2 themselves. Then, the receiving terminal device judges that even when CM1 and CM2 are thinned out, the time difference still can not be solved and executes out the catch-up reproduction processing concerning a main content of the program A following CM2 (the same figure (d)). In this case, since it is not preferable to thin out itself in the same way as CM1 and CM2, the receiving terminal device executes fast play reproduction with the extent that a viewer can recognize the contents. The extent (speed) of the fast play reproduction may be changed for example, by remote control of a viewer. The receiving terminal device, in case that it is judged that the time difference was solved (caught up) by the catch-up reproduction processing, returns the main content of the program A to normal reproduction (the same figure (e)).

For example, it is assumed that time when the data broadcasting program B is presented for transition is 1 minute and 15 seconds. Further, it is assumed that CM1 and CM2 are of 30 seconds, respectively. In this case, the receiving terminal device thins out CM1 and CM2 so that the time difference of remaining 15 seconds is made to occur. Assuming that, as the catch-up reproduction processing to the main content, the 10 second reproduction in the real time axis is executed for 8 seconds in the reproduction time axis (20% fast play reproduction), the catch-up is accomplished for 75 seconds.

In the operation example, it was explained that commercial programs CM1 and CM2 were thinned out and the catch-up reproduction processing is applied to a portion of the time difference which could not be appropriated by the fast play reproduction to the main content but the fast play reproduction may be applied to CM1 and CM2 and only extent of start several seconds maybe reproduced, respectively. Furthermore, the fast play reproduction may not be applied to the main content but the catch-up reproduction processing may be applied only to the commercial programs. That is, to the main content, the catch-up reproduction (time difference reproduction) by normal reproduction may be applied and every time that a commercial program is broadcast, the catch-up reproduction processing may be applied to the commercial program until the time difference is solved.

As described above, according to the embodiment, when a particular program which is being viewed by a viewer is switched to another program, storage of the stream corresponding to the program is started and when the switched program is switched to the former program, the stored stream is reproduced and contents of the program A which was interrupted can be viewed without fail.

Further, according to the embodiment, since the catch-up reproduction processing is executed on the occasion of reproducing the stream which was stored, the time difference in the real time axis can be solved.

Accordingly, a viewer can view a real time program, without recognizing a video recording reservation, with enjoying a program switching.

Second Embodiment

This embodiment relates to a modified example of the above-described storage/catch-up reproduction processing, and more specifically, is characterized in that a stream (packet) which is judged to be unnecessary because of the catch-up reproduction processing is not revoked but stored again in the storing device 208 so that a viewer can view it by reading out and reproducing it at arbitrary timing.

Figure 9:
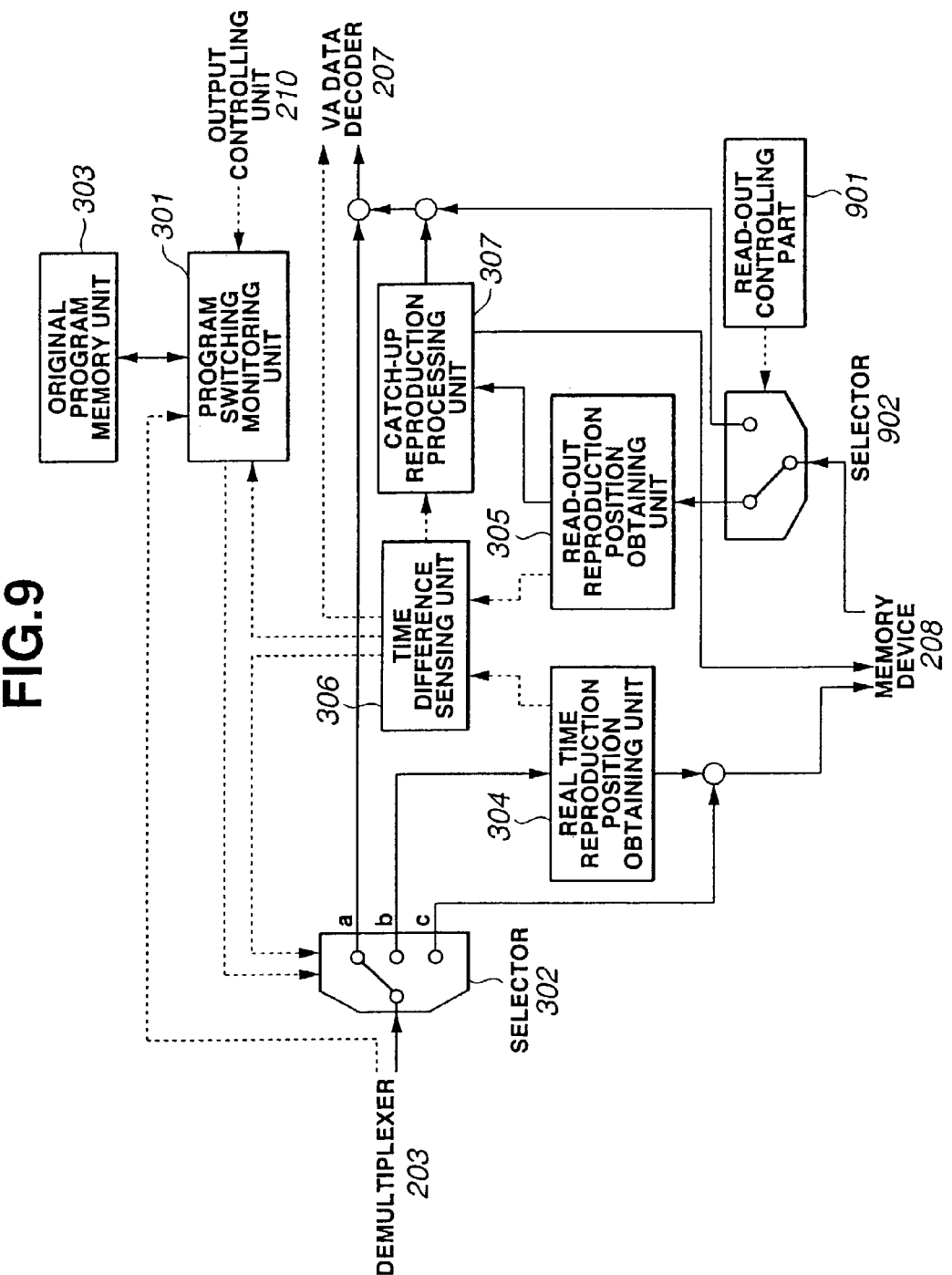
FIG. 9 is a block diagram showing a structure of a stream controlling unit according to a second embodiment.

FIG. 9 is a block diagram showing a structure of the stream controlling unit 206 according to the embodiment. In this figure, the same symbols are applied to the same element for realizing functions as in the above embodiment.

As shown in the figure, the stream controlling unit 206 further comprises a read-out controlling unit 901 and a selector 902, and the catch-up reproduction processing unit 307' is configured so that it can send out again a video/audio stream which became an object for the catch-up reproduction processing to the storing device 208. In addition, it is preferable that the catch-up reproduction processing unit 307', on the occasion of storing again in the storing device 208, stores with respect to each category which the program contents belong to. Such category can be specified with reference to LIT. Further, filtering information in accordance with preference of a viewer may be set in advance and program contents which are judged to be necessary may be stored in the storing device 208 in accordance with this filtering information. The filtering information is inputted through for example, the input unit 201 and stored in a predetermined memory area.

The read-out control part 901, when it receives an instruction for video recording and reproducing through the input unit 204 from a viewer, controls the selector 902 to directly send out a video/audio steam which is read out from the storing device 208 to the VA data decoder 207a. At this time, it is preferable that the receiving terminal device stops receiving by the tuner 201. Thus, the receiving terminal device, in the same way as normal video recording and reproducing, can read out the stream which was stored again in the storing device 208 and can reproduce it. Accordingly, a viewer, for example in case of convenient time for him/her, can view only commercial programs.

Third Embodiment

This embodiment relates to a modified example of the above-described storage/catch-up reproduction processing, and more specifically, is characterized in that in a particular program, when a certain program content is broadcast for the second time or more, thin-out is executed to the second or subsequent broadcast program content in the receiving terminal device. In other words, in case that a portion which is stored contains the same program content, reproduction is executed by avoiding overlap of the content.

Figure 10:
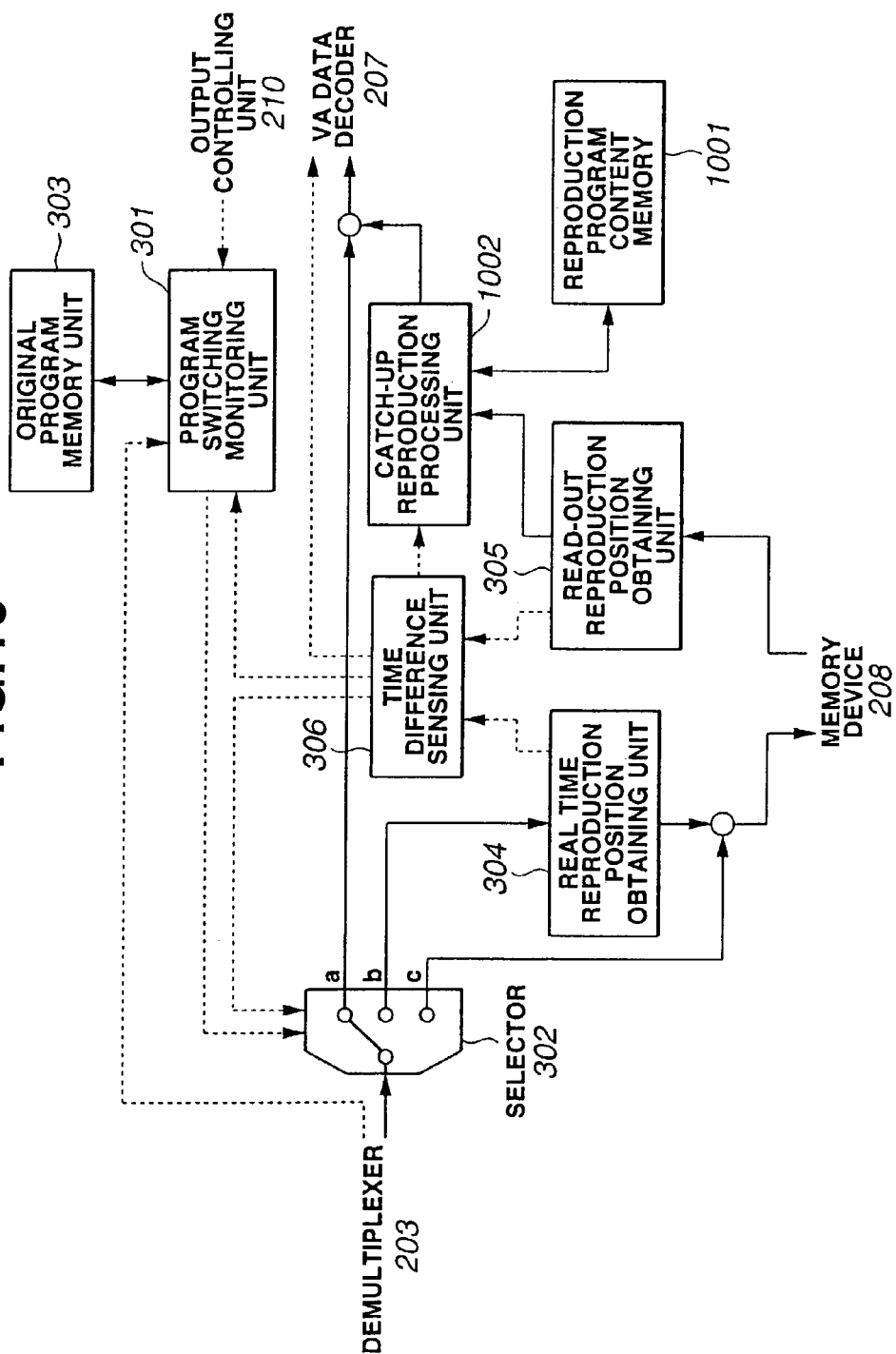
FIG. 10 is a block diagram showing a structure of a stream controlling unit according to a third embodiment.

FIG. 10 is a block diagram showing a structure of the stream controlling unit 206 according to the embodiment. In this figure, the same symbols are applied to the same means for realizing functions as in the above embodiment.

As shown in the figure, the stream controlling unit 206 further comprises a reproduction program content memory 1001. The reproduction program content memory 1001 stores information for identifying a program content corresponding to a stream which is an object for the catch-up reproduction processing and which has been already sent out to the VA data decoder 207a. A catch-up reproduction processing unit 1002 refers to the reproduction program content memory 1001 and judges as the same program content as the program content which had been already reproduced, executes the catch-up reproduction processing concerning a video/audio stream which is being read out.

Figure 11:
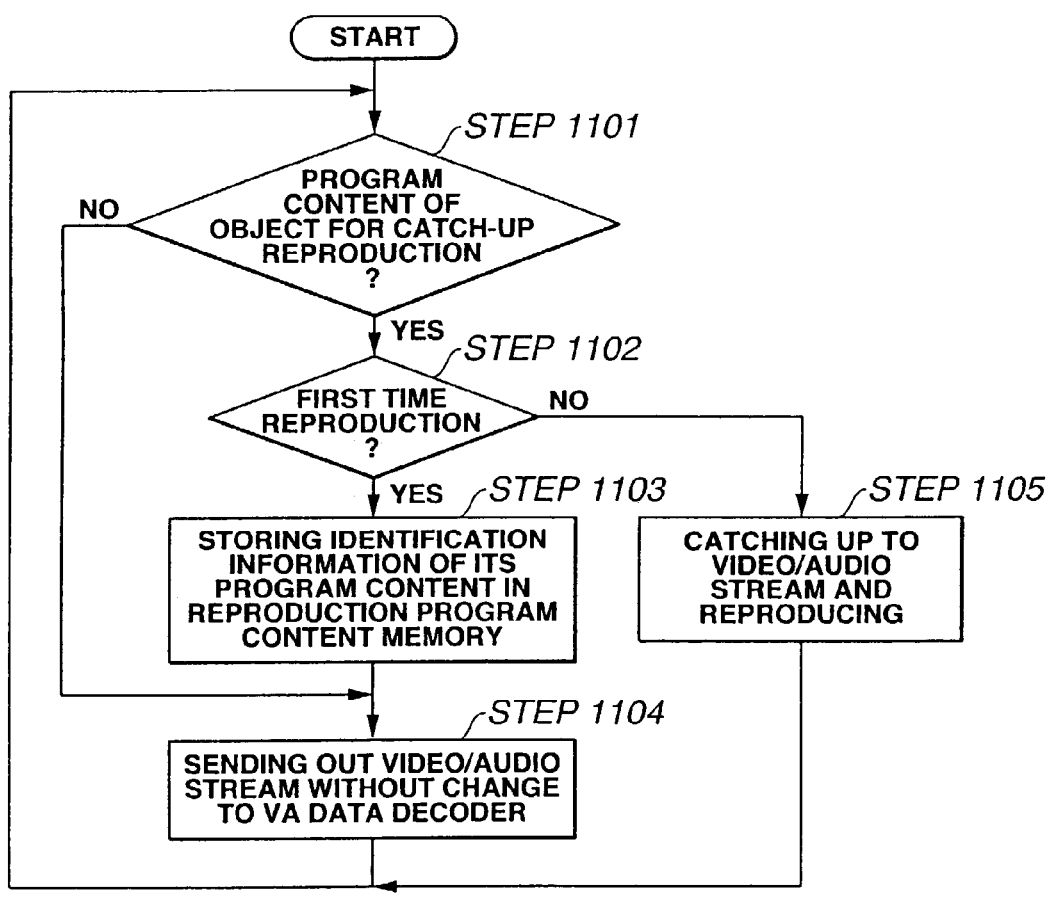
FIG. 11 is a flow chart for explaining an operation of a catch-up reproduction processing unit according to the third embodiment.

FIG. 11 is a flow chart for explaining an operation of the catch-up reproduction processing unit 1002 according to the embodiment. As shown in this figure, the catch-up reproduction processing unit 1002, as to a video/audio stream which is being read out from the storing device 208, judges whether it is a program to be catch-up reproduced or not (STEP 1101) In this embodiment, it is assumed that a particular program content such as a commercial program and so on is an object for the catch-up reproduction. If the catch-up reproduction processing unit 1102 judges that the program content is the object for catch-up reproduction, judges whether it is no yet reproduced even once, that is, it is an initial reproduction or not (STEP1102). The catch-up reproduction processing unit 1002 judges as the initial reproduction, writes identification information of its program content in the reproduction program content memory 1001 (STEP 1103), and directly sends out the video/audio stream to the VA data decoder 207a (STEP1104). On the other hand, when the catch-up reproduction processing unit 1002 judges that the program content was already reproduced, that is, the program is reproduced for the second time or more, because the identification information is recorded in the reproduction program content memory 1001, the catch-up reproduction processing unit 1002 executes the catch-up reproduction processing on a video/audio stream that is read out (STEP1105). In case that a program content is not the object for catch-up reproduction, for example is content of the main program, the catch-up reproduction processing unit 1001 sends out the video/audio stream to the VA data decoder 207a.

Figure 12:
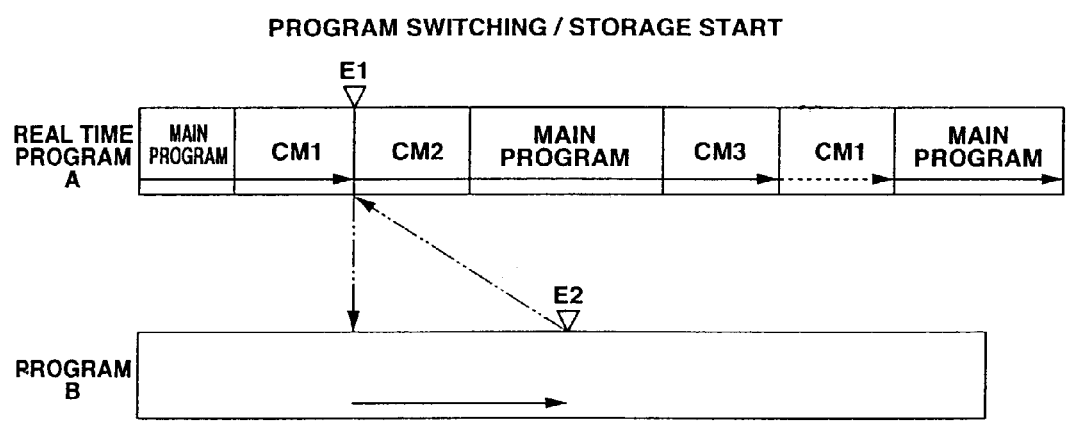
FIG. 12 is a view for explaining one example of program switching.

Next, an operation example of the receiving terminal device according to the embodiment will be explained by use of FIG. 12. FIG. 12 is a view for explaining a condition of program switching when a program is viewed as a stream. In this figure, a content which is viewed by a viewer is shown by a solid line arrow and a content which the catch-up reproduction processing is applied to is shown by a wavy line arrow.

It is assumed that a viewer selects a real time program A of a broadcasting station which is conducting a program providing service which the storage/catch-up reproduction can be applied to. Further, it is assumed that a program B is also a real time program.

Now, it is assumed that while, the commercial program CM1 is being viewed following the main program content, the program switching E1 occurs and it is switched to the program B. The program switching E1 occurs by, for example, a fire triggered by an event message which is transferred by a data broadcasting channel, or a program switching operation conducted by a viewer. The receiving terminal device starts a video recording of the program A which was switched, that is, storage of its video/audio stream. Assuming that after lapse of predetermined time, program switching E2 occurred and the program A was selected again, the receiving terminal device starts reproduction of the program A which was being stored. The receiving terminal device, since CM2 has not yet been viewed, reproduces it as-is, and thereafter reproduces the main content and CM3. When the receiving terminal device comes to the point where the CM1 is just being reproduced, it thins out (skips) the CM1 because it judges that the CM1 was already viewed. Thus, it is possible to solve the time difference by a time portion which is required for reproduction of CM1. The receiving terminal device, after it skips CM1, reproduces the main program content. In the embodiment, even by the thin-out of CM1, the time difference which is generated by the interruption can not be solved. Then, it is preferable that the receiving terminal device, in case that CM2 and CM3 are broadcast again, solves the time difference by thinning out them. Further, a commercial program may be reproduced in fast play.

As described above, according to the present embodiment, when a certain program content is broadcasted for the second time or more in a particular program, the reproduction of that program content which is broadcasted for the second time or more will be omitted. Accordingly, the viewer will be forced to view the same commercial program, etc., repeatedly.

Fourth Embodiment

This embodiment relates to a modified example of the above-described storage/catch-up reproduction processing. More particularly, this embodiment is characterized in that, a main program content in a particular program is displayed on a first window (screen) and another program content as an object for catch-up reproduction is displayed on a second window.

For example, as shown in FIG. 13(a), the receiving terminal device divides a screen area which is displayed on a display 211a into a screen W1 and a screen W2, and reproduces a program content on respective screens. Such a viewing mode is called as a multiscreen. In this figure (a), a program content of the main program is reproduced on the screen W1 and a commercial program in the stored program contents is reproduced on the screen W2. Further, as shown in this figure (a), the receiving terminal device may divide the screen are into 3 areas. In this case, it is preferable that an aspect ratio of the screen is converted from 16:9 to 4:3.

Figure 14:
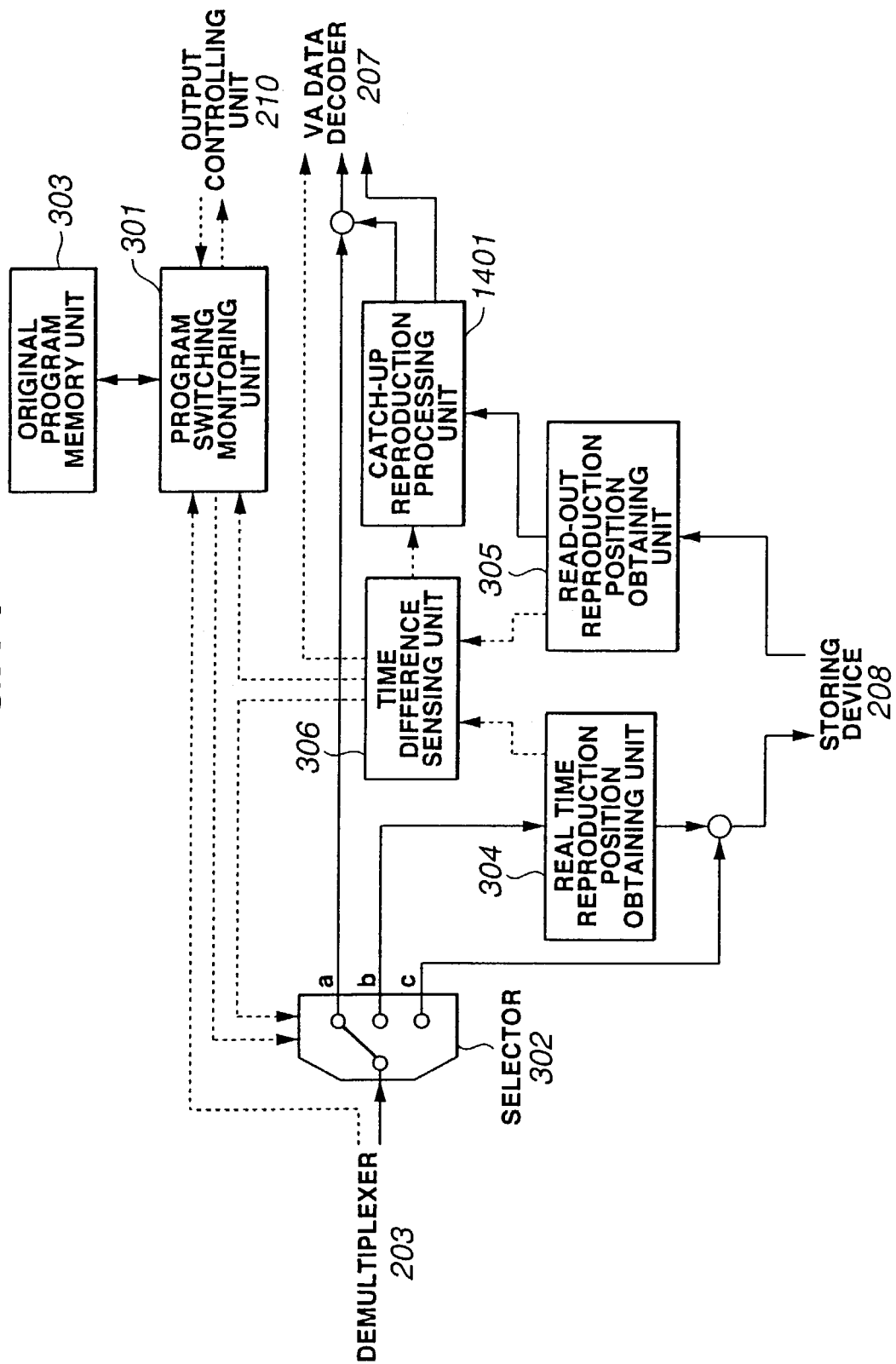
FIG. 14 is a block diagram showing a structure of a stream controlling unit according to a fourth embodiment.

FIG. 14 is a block diagram showing a structure of the stream controlling unit 206 according to the embodiment. In addition, in this figure, the same symbols are applied to the same means for realizing functions as in the above embodiment.

As shown in the figure, the stream controlling unit 206 sends out a video/audio stream corresponding to a main program content to be displayed on the first screen and a video/audio stream corresponding to another program content to be displayed on the second screen to the VA data decoder 207a, respectively. That is, as to a main program content, the stream controlling unit 206 sends out a video/audio stream which was read out from the storing device 208 to the VA data decoder 207a in the same manner as in the above embodiment until the time difference is solved, and at the time point that the time difference is solved, sends out a video/audio stream which is sent out from the demultiplexer 203 to the VA data decoder 207a. On the other hand, as to a content of another program such as a commercial program, etc., other than a main program, the stream controlling unit 206 sends out the video/audio stream which was read out from the storing device 208 separately to the VA data decoder 207a. More specifically, a catch-up reproduction processing unit 1401 judges that a video/audio stream which was read out from the storing device 208 corresponds to a main program or not, and when it is judged as the video/audio stream corresponding to a program other than a main program, for example, a commercial program, sends out to the VA data decoder 207a separately from the video/audio stream corresponding to the main program content. Thus, since the stream control part 206 is possible to send out a more video/audio stream from the storing device 208, the time difference can be solved.

Fifth Embodiment

This embodiment relates to a modified example of the above-described storage/catch-up reproduction processing. More specifically, the embodiment is characterized in that at a time point that a program is switched, position information (reproduction start position information) by which reproduction of a stream is to be resumed is set and stored in advance, and when it is returned to the program, reproduction is resumed from the stream specified by the reproduction start position information.

Figure 15:
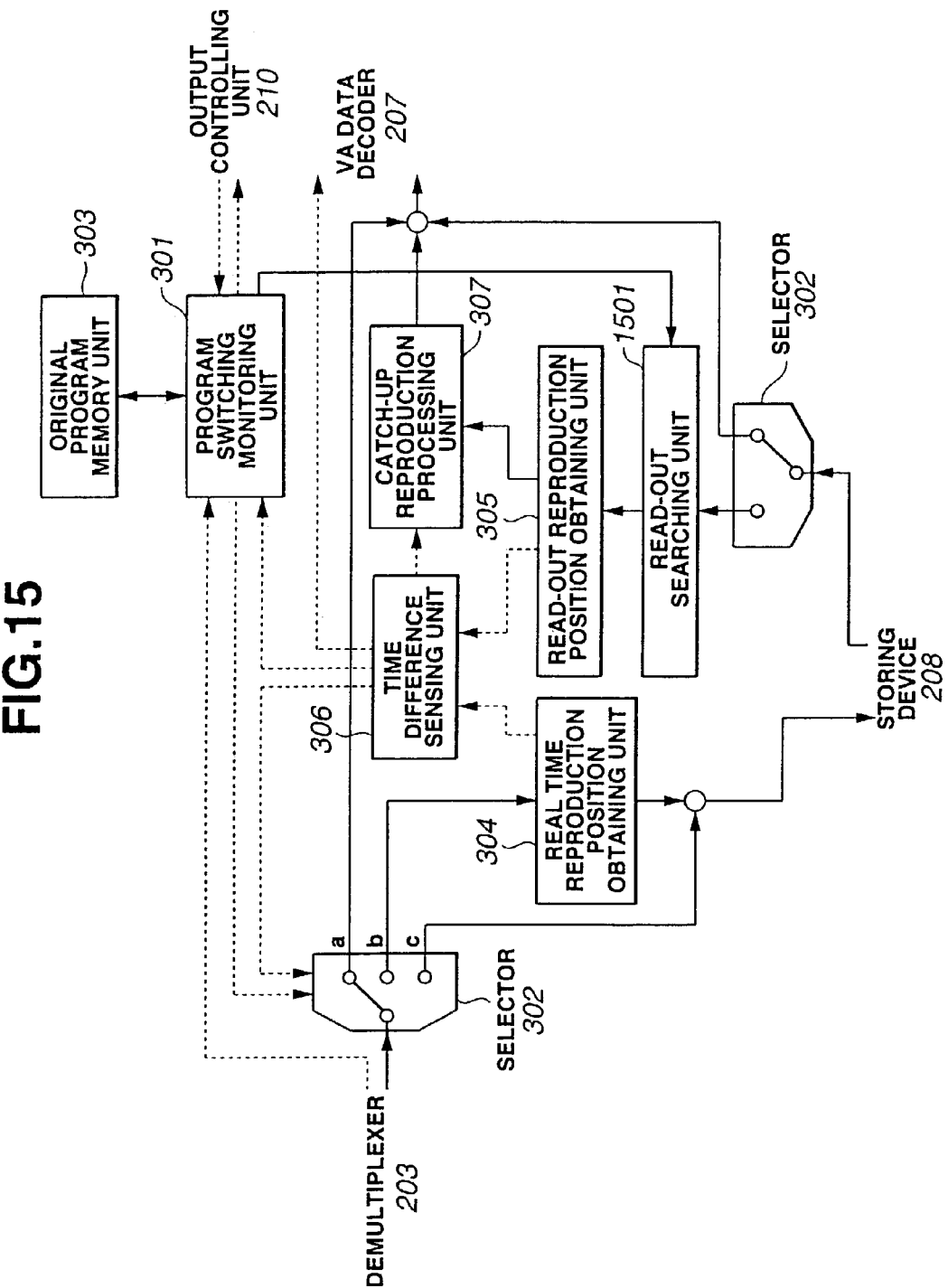
FIG. 15 is a block diagram showing a structure of a stream controlling unit according to a fifth embodiment.

FIG. 15 is a block diagram showing a structure of the stream control unit 206 according to the embodiment. In this figure, the same symbols are applied to the same means for realizing functions as in the above embodiment.

In the embodiment, in order to simplify an explanation, it is assumed that a video/audio stream is all sent out through the storing device 208 to the VA data decoder 207a. That is, in the initial state, a video/audio stream is stored through the terminal c of the selector 302 in the storing device 208 and read out from the storing device 208 and sent out through the selector e to the VA decoder 207a.

When the program switching monitoring unit 301 judges that the initial state is transferred to the first state, the program switching monitoring unit 301 stores program number of the program A and reproduction start position information into the original program memory 303. In the embodiment, it is assumed that an event ID of LIT which is defined as PSI/SI is used as the reproduction start position information. The event ID is sent out from either the output controlling unit 210 based upon fire of an event message or sent out from the demultiplexer 203. When the program switching monitoring unit 301 judges that the first state is transferred to the second state, it controls the selector 302 to select the terminal b and controls a selector 1501 to select a terminal d, respectively, and informs a read-out searching unit 1501 of the event ID which was stored in the original program memory 303.

The read-out searching unit 1502 reads out a video/audio stream (packet) after the event ID from the storing device 208 in accordance with the event ID which was informed, and sends out it to the read-out reproduction position obtaining unit 305. Thus, it becomes possible to read out from the video/audio stream at the position which was designated by the event ID and to reproduce it.

The catch-up reproduction processing unit 307 executes catch-up reproduction processing concerning the video/audio stream which was read out, in the same way as in the above embodiment. Then, the time difference detecting unit 306, at the time point that the time difference was solved, controls the selector 302 and the selector 1601.

In addition, an event relation table ERT (Event Relation Table) etc. may be used as the reproduction start position information. Further, sequence number of a packet may be used as the reproduction start position information. Further, time management information at the time point of program switching may be obtained and reproduction of a stream may be executed from the position which is shown by the time management information.

Furthermore, the reproduction start position information is not limited to the time point that a program was switched. For example, it may be a head position of a certain program content (for example, commercial program) which is included in a main program.

Figure 16:
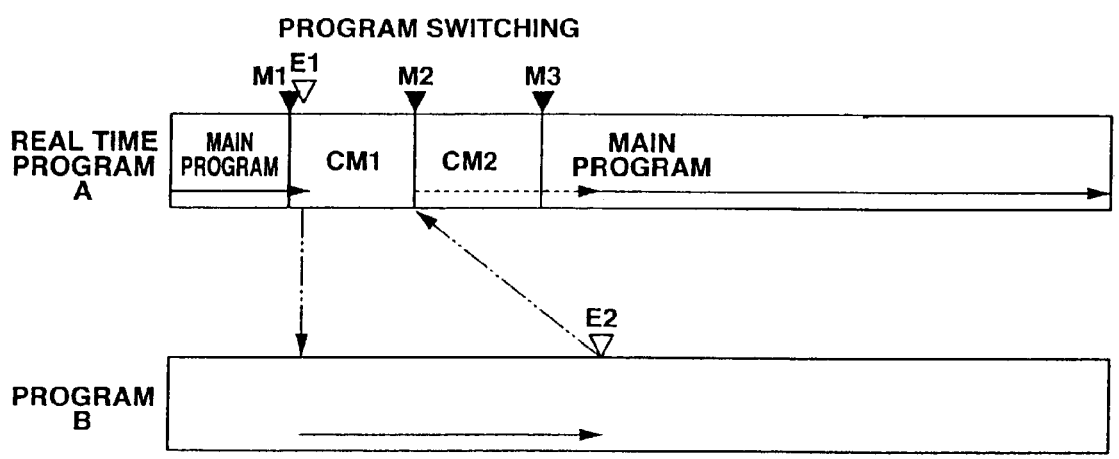
FIG. 16 is a view for explaining one example of program switching.

Next, an operation example of the receiving terminal device configured as described above according to the embodiment will be explained by use of FIG. 16. FIG. 16 is a view for explaining a condition of program switching when a program is viewed as a stream.

Firstly, it is assumed that a viewer is selecting a real time program A of a broadcasting station which is conducting a program providing service in which storage/catch-up reproduction is possible. In addition, it is assumed that a data broadcasting program B is one which realizes a interlock type data broadcasting service of the program A and transferred in advance by the Carousel system and stored in the storing device 208.

Now, it is assumed that while a main program content is being viewed, program switching E1 occurs and a screen is switched to the data broadcasting program B (FIG. 16B). The program switching E1 occurs by fire of an event message which is transferred in a data broadcasting channel or a program switching operation by a viewer. After lapse of a predetermined time, if the program switching E2 occurred or the program A was selected again, the receiving terminal device starts reproduction of the program A which is stored in accordance with the reproduction start position information. It is assumed that, the reproduction start position information M2 is designated in advance by an instruction from the broadcasting station. At this time, the receiving terminal device executes the catch-up reproduction processing concerning CM2, in order to solve the time difference which was generated by the interruption. The receiving terminal device, while the catch-up reproduction processing is being executed, displays the time difference information on the screen, in order to present to the viewer how much time difference has occurred. The catch-up reproduction processing is executed, for example, on CM2 and the main program content. When the receiving terminal device judges that the time difference was resolved (caught up) by the catch-up reproduction processing, it reproduces the main program content of the program A under the normal reproduction.

In addition, in the embodiment, a position which is shown by the reproduction start position information is M2 but M1 before the program switching time point may be designated. In this case, CM1 is made to be reproduced from the beginning. This means that a viewer can view the whole CM1.

OTHER EMBODIMENT

The above-described respective embodiments are examples for explaining the invention, and it does not mean that the invention is limited only to these embodiments.

The invention can be practiced in various embodiments as exemplified below as long as not deviated from the spirit of the invention.

(1) In the above-described embodiments, as causes of program switching, it is explained about one by a viewer himself/herself and/or one by an event message, but it may be one by effect of reservation using EPG and one by a link descriptor and a hyper link descriptor. Further, switching may be executed by executing launchDocument( ) and an applet of scripts in contents data. These program switching is detected by a script which parses an instruction from the input unit or detected by a script for changing a service ID and/or PID.

(2) The receiving terminal device may be configured to store as an entire transport stream during the stream is stored. Further, as to a stream to which a scramble is applied to, it is preferable to store it after it was descrambled.

(3) The receiving terminal device may be configured to be able to select whether contents such as a flash report according absolute time is displayed or not, on the occasion of the catch-up reproduction processing, by an instruction of a viewer.

(4) In the above-described embodiments, it is explained about the switching between a real time type program and a data broadcasting program but it is not stick upon this combination in particular. An embodiment for switching between real time type programs, between data broadcasting programs is included in the aspect of the invention. Further, the first stream may be a real time type program and the second stream may be a program which was video recorded.

In case of the switching between the above-described real time programs, a plurality of receiving functions are required. On the other hand, in case of the switching between data broadcasting programs, a function to store multiple Carousel data in plurality is required. These required functions can be implemented in response to the above switching need. For example, if there is a request for switching real time programs A, B, and C, one by one, at least three receiving functions are required. On the other hand, if an operation is set to execute transition only in the same TS at a broadcasting station side, only one receiving function may be required. Further, if the program after the switch must be returned to the original program by all means even in case of switching by an operation of the viewer, only two receiving functions may be required.

(5) In the above-described embodiments, it is assumed that, when a viewer switched the program A to the program B, video recording is executed to the program A uniformly but, the video recording may be executed under selection of the viewer. That is, the viewer operates a first operation to switch from the program A to the program B, video recording to the program A may be executed, and when the viewer operates a second operation, video recording to the program A may not be executed. The first and second operations are judged by, for example, sort of a button which is pressed down.

(6) When the program selection is not returned back to the program A for a predetermined time after the selection is switched from the program A to the program B and the receiving terminal device has started the video recording of the program A, the receiving terminal device may stop the video recording of the program A.

(7) The video recording that starts when the program selection is switched from the program A to the program B may be designed such that it records only the program A. That is, the receiving terminal device stops the video recording at the time when the program A ends; it does not record another program which is broadcasted following the program A. Whether broadcasting of a program ends or not is judged with reference to EIT (Event Information Table).

As stated above, according to the invention, it becomes possible to provide a broadcasting service which does not cause a viewing failure of a program content, even in case that a switching of program selection is executed.

The invention claimed is:

1. A receiver terminal device comprising:
a stream receiver configured to receive a stream;
a program selecting unit configured to select a particular stream from the received stream based on program selection information;
a stream controlling unit configured to perform path control of the particular stream;
a storage device configured to store the particular stream transmitted from the stream controlling unit; and
an output controlling unit configured to output a video/audio signal based on the particular stream transmitted from the stream controlling unit;
wherein the stream controlling unit comprises:
a memory unit configured to store a program number of the particular stream, and
a monitoring unit configured to detect states of program switching based on a program number stored in the memory unit,
wherein, if the monitoring unit detects an initial state, the stream controlling unit performs path control such that a first stream selected by the program selecting unit is transmitted to the output controlling unit, the initial state indicating that the first stream is selected for a first time, and
wherein, if the monitoring unit detects a first state, the stream controlling unit performs path controls such that a stream in the first stream following the point in time at which a second stream is selected by the program selecting unit is stored in the storage device, the first state indicating that the first stream is switched to the second stream.

2. The receiving terminal according to claim 1, wherein, if the monitoring unit detects a second state, the stream controlling unit performs path control such that the stored stream in the first stream is retrieved from the storage device and transmitted to the output controlling unit while a stream in the first stream following the point in time at which the second stream is selected by the program selecting unit, the second state indicating that the first stream is switched back from the second stream.

3. The receiving terminal device according to claim 2, wherein said receiving terminal device obtains a reproduction start position information from the received stream and reproduces the stored stream from the reproduction start position.

4. The receiving terminal device according to claim 2, wherein said receiving terminal device obtains time management information in the selected time point and reproduces the stored stream from a position specified in the obtained time management information.

5. The receiving terminal device according to claim 2, wherein when the first stream is selected again, said receiving terminal device reproduces the stored stream in the manner that a reproduction position of the stored stream in a reproduction time axis catches up with a reproduction position of the first stream in a real time axis.

6. The receiving terminal device according to claim 5, wherein said receiving terminal device displays on a screen a time difference information between the reproduction position of the stored stream in the reproduction time axis and the reproduction position of the first stream in the real time axis.

7. The receiving terminal device according to claim 5, wherein said receiving terminal device reproduces the stored stream while executing a thin-out processing on the stored stream.

8. The receiving terminal device according to claim 7, wherein said receiving terminal device executes a thin-out processing on a partial stream corresponding to a predetermined program content in the stored stream.

9. The receiving terminal device according to claim 8, wherein said receiving terminal device stores the thinned out partial streams.

10. The receiving terminal device according to claim 7, wherein said receiving terminal device executes a thin-out processing of a partial stream corresponding to a program content other than a program content in the stored stream which is selected in accordance with user information inputted in advance, based upon a predetermined information contained in the stored stream.

11. The receiving terminal device according to claim 7, wherein when the stored stream includes n partial streams corresponding to a predetermined program content, said receiving terminal device thins out n−1 partial streams.

12. The receiving terminal device according to claim 5, wherein said receiving terminal device stores the first stream until the reproduction position of the stored stream in the reproduction time axis catches up with the reproduction position of the first stream in the real time axis.

13. The receiving terminal device according to claim 1, wherein when the first stream is selected again after said second stream is selected, said receiving terminal device reproduces the selected first stream on a first window and reproduces the stored stream on a second window.

14. The receiving terminal device according to claim 13, wherein said receiving terminal device reproduces the partial stream corresponding to the first program content in the stored stream on the second window.

15. The receiving terminal device according to claim 13, wherein said receiving terminal device executes fast play reproduction of the partial stream corresponding to the second program content in the stored stream on the second window.

16. The receiving terminal device according to claim 1, wherein said receiving terminal device selects the second stream based upon program selection information in the received stream.

17. The receiving terminal device according to claim 1, wherein said receiving terminal device selects the second stream based upon program selection information supplied from a viewer.

18. The receiving terminal device according to claim 1, wherein said receiving terminal device selects the second stream based upon schedule information set based upon program guide information.

19. A method for providing a program comprising:
receiving a stream comprised of a plurality of particular streams;
selecting a particular stream from the received stream based on program selection information;
performing pat control of the particular stream;
storing the particular stream;

outputting a video/audio signal based on the particular stream;

monitoring to detect states of program switching based on a program number stored in a memory;

wherein, if the monitoring detects an initial state, the initial state indicating that a first stream is selected for a first time, the first stream is selected and output, and wherein, if the monitoring detects a changed state, the changed state indicating that the first stream is switched to a second stream, a stream in the first stream is stored from a point in time at which the second stream is selected.

20. The program providing method of claim 19, wherein when the first stream is switched back, The stored stream corresponding is executed such that a position of recording and reproducing the first stream catches up with the position in which the first stream is being broadcast by a broadcasting station.

21. The program providing method of claim 20, wherein the first stream is recorded until the position of recording and reproducing the first stream catches up with the position in which the first stream is being broadcasted by the broadcasting station by the catch-up reproduction.

* * * * *